J. F. PEASE.

HOT AIR FURNACE.

No. 10,113. Reissued May 16, 1882.

WITNESSES —
Wm. L. Raymond
C. H. Duell

INVENTOR —
John F. Pease
per Duell, Laass & Hey
his attorneys

N. PETERS, Photo-Lithographer, Washington, D. C.

UNITED STATES PATENT OFFICE.

JOHN F. PEASE, OF SYRACUSE, NEW YORK.

HOT-AIR FURNACE.

SPECIFICATION forming part of Reissued Letters Patent No. 10,113, dated May 16, 1882.

Original No. 192,837, dated July 10, 1877. Application for reissue filed March 13, 1882.

*To all whom it may concern:*

Be it known that I, JOHN F. PEASE, of Syracuse, in the county of Onondaga and State of New York, have invented new and useful Improvements in Hot-Air Furnaces, of which the following, taken in connection with the accompanying drawings, is a full, clear, and exact description.

This invention relates to improvements in that class of hot-air furnaces in which the products of combustion are conveyed through a radiator arranged around the exterior of the combustion-chamber.

My invention consists in a novel, simple, and comparatively inexpensive construction of a radiator, which is easily connected with a furnace, easily renewed, repaired, and cleaned, and which also greatly augments the heating capacity of the furnace without impairing its draft.

Figure 1:
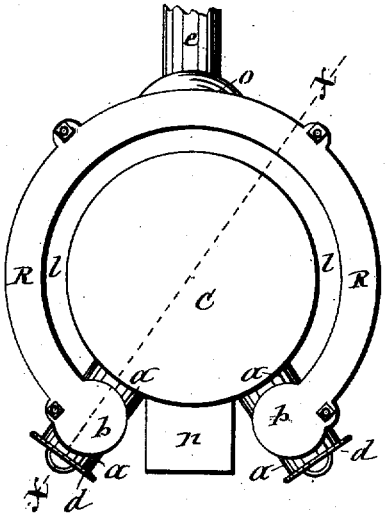
Figure 2:
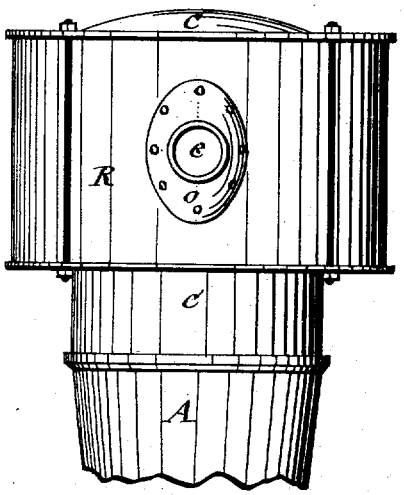
Figure 3:
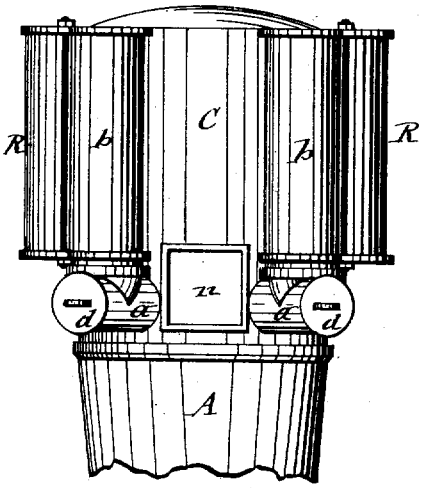
Figure 4:
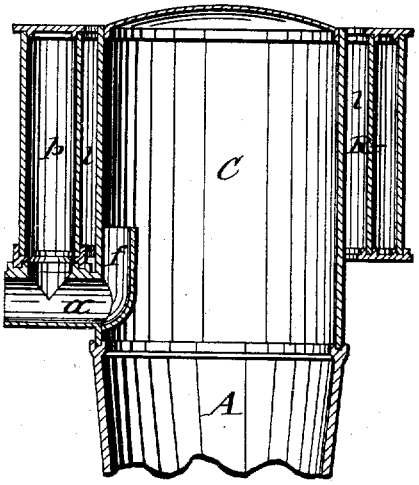

The invention is fully illustrated in the accompanying drawings, wherein Figure 1 is a top view of a furnace with my improved radiator applied thereto. Fig. 2 is a rear view of the same; Fig. 3, a front view, and Fig. 4 a vertical section on line *x x* in Fig. 1.

Like letters of reference indicate like parts in all the figures.

A represents the fire-pot, and C the so-called "combustion-chamber," mounted on top of the fire-pot, and receiving therefrom the products of combustion, which, by their impinging the sides and top of said combustion-chamber, produce radiation of heat from the latter.

R denotes my improved radiator in the form of a deep narrow segmental flue, arranged around the exterior of the combustion-chamber, with an air-passage, *l*, between them. Said radiator is constructed of two segments of sheet-metal cylinders of different diameters, arranged concentrically side by side, united at the ends, and closed at the top and bottom by segments of annular plates. It is isolated from the body of the furnace to form the air-passage *l* aforesaid, and is readily applied to the furnace, and as readily removed when required for repairs or renewal. It communicates at the front with the combustion-chamber C by horizontal flues *a a* at or near the sides of the feed-door *n*, and has the exit-flue *e* at the rear. A vertical branch of said flues *a* conducts the products of combustion into the radiator. For the purpose of further increasing the radiating-surface, and of allowing free ingress for the products of combustion to the radiator R, said radiator is provided with cylindrical enlargements *b b* at the points where it communicates with the combustion-chamber. By these enlargements the products of combustion are allowed to freely enter the radiator R, and in their subsequent passage through the narrow main portion of the radiator they become thoroughly diffused and are caused to effectually impinge the sides of the radiator, thus materially augmenting the heating capacity of the apparatus.

O is an oval concavo-convex plate, provided with a thimble for the attachment of the exit-flue, and fitted to an enlarged opening in the rear of the radiator, thereby augmenting the exit and improving the draft. The radiator, being free from partitions and other obstructions, is easily cleaned by inserting a broom through the exit *e* and sweeping the soot and ashes forward into the flues *a a*, from whence they can be readily removed by taking the covers *d d* off from the outer ends of the said flues.

*f* is a shield or bridge over the inner end of the flues *a a*, extending upward, so as to cause the products of combustion to rise in the combustion-chamber and retard the escape of the heat.

What I claim as my invention is—

1. In combination with the combustion-chamber C, the radiator R, consisting of two segments of cylinders of different diameters arranged concentrically side by side, united at the ends, and closed at the top and bottom, and communicating with the interior of the combustion-chamber at or near the feed-door, and provided with an exit for the products of combustion, substantially as set forth.

2. In combination with the combustion-chamber C, the radiator R, arranged around the exterior of the combustion-chamber, and consisting of two segments of cylinders placed concentrically side by side, closed at the top and bottom, and terminating with cylindrical enlargements *b b*, a flue extended from the cylinder *b* to the combustion-chamber, and an exit, *e*, in the radiator for the escape of the products of combustion after their circulation through said radiator, as set forth.

3. In combination with the combustion-chamber C, the radiator R, consisting of a deep narrow segmental flue arranged around the exterior of the combustion-chamber and communicating therewith, and the cleaning-flues *a a*, connected to the base of the radiator and provided with removable covers *d d*, as and for the purpose set forth.

4. The combination of the radiator R, constructed of two segments of cylinders of different diameters arranged concentrically side by side, united at the ends, and closed at the top and bottom by segments of annular plates, the horizontal flues *a a*, and interior passages formed by bridges *f*, substantially as shown and described.

5. The combination of the radiator R, constructed of two segments of cylinders of different diameters arranged concentrically side by side, and closed at the top and bottom by segments of annular plates, and formed with cylindric enlargements *b b* at its ends, the horizontal flues *a a*, and bridges *f*, all constructed and combined substantially in the manner described and shown, for the purpose set forth.

In testimony whereof I have hereunto set my hand, in the presence of two attesting witnesses, at Syracuse, in the county of Onondaga and State of New York.

JOHN F. PEASE.

Witnesses:
C. H. DUELL,
WM. C. RAYMOND.